United States Patent

[11] 3,540,485

[72] Inventor: Joel S. Kummins
Midland, Michigan
[21] Appl. No.: 669,232
[22] Filed: Sept. 20, 1967
[45] Patented: Nov. 17, 1970
[73] Assignee: General Electric Company
a corporation of New York

[54] PELLET FOR EVOLVING GAS AT A UNIFORM RATE AND AN APPARATUS FOR ITS USE
3 Claims, 2 Drawing Figs.

[52] U.S. Cl. ................................................. 136/86;
23/211; 117/100; 252/188.3
[51] Int. Cl. ..................................................... H01m 27/14
[50] Field of Search ................................................. 136/86;
252/182, 186, 188, 188.3; 117/100I, 100M;
23/211

[56] References Cited
UNITED STATES PATENTS
2,179,242  11/1939  Ham .............................. 252/188.3X
2,196,901  4/1940  Ham .............................. 252/188.3X
2,245,495  6/1941  Pemble ......................... 252/186
3,361,638  1/1968  Bokros et al. ................. 117/100IX
3,450,638  6/1969  Edwards ....................... 252/188.3X
3,134,697  5/1964  Nodrach ......................... 136/86

Primary Examiner—Allen B. Curtis
Attorney—Nathan J. Cornfeld, Carl O. Thomas, Melvin M. Goldenberg, Frank L. Neuhauser and Oscar B. Waddell ABSTRACT: The invention is directed to a pellet having an enveloping zone which is capable of evolving gas when contacted with a liquid reactant at a rate approximating the rate at which a central zone evolves gas when contacted with the same liquid reactant. In one form the outermost zone may have reactivity per unit volume no lower than that of the next inner zone so that delay in reaching the maximum gas evolution rate is minimized or avoided. The pellet may be incorporated in a gas generator and the generator connected to a cell adapted to consume gas in operation.

Patented Nov. 17, 1970

3,540,485

INVENTOR:
JOEL S. KUMMINS,
BY Carl O. Thomas
HIS ATTORNEY.

PELLET FOR EVOLVING GAS AT A UNIFORM RATE AND AN APPARATUS FOR ITS USE

My invention relates to a pellet for evolving as at a substantially uniform rate and to a gas generator and a cell adapted to consume the gas, which may be used in combination with the pellet.

Fuel cells are devices which generate electricity when a fluid fuel, such as hydrogen gas, is delivered to one electrode and a fluid oxidant, such as air, is made available to the remaining electrode. With the development of gas consuming cells, such as fuel cells, a need has been created for a safe, reliable, and convenient source of gaseous reactant. A typical technique for generating a gaseous reactant for low power cells is to introduce a pellet or tablet of a solid material into a Kipp-type generator containing a suitable liquid that will react on contact with the tablet to produce the desired gaseous reactant as a product.

A disadvantage associated with this approach is that the tablet will initially generate gas at a low rate but quickly accelerate to a maximum rate of gas generation. Thereafter, as the size of the tablet is reduced by surface consumption, the reaction rate declines so that by the time the nucleus of the tablet is reached the rate of gas evolution may decline to a value too low to sustain useful operation of the cell or cells being served by the gas generator. If, on the other hand, the pellet is sized so that the terminal gas generation rate is adequate, the high gas generation rate obtained shortly after introduction into contact with the liquid reactant may prove a potential hazard.

It is an object of my invention to provide a pellet which upon contact with a liquid reactant will generate a gas at a substantially uniform rate.

It is another object of my invention to provide a system for generating electricity including a pellet which upon contact with a liquid reactant will deliver gas at a uniform rate to the electricity generating portions of the system.

In one aspect, my invention is directed to a pellet for generating at a uniform rate a gas capable of being consumed at a cell electrode. The pellet includes a central zone comprised of first solid reactant means for evolving the gas at a predetermined rate when the central zone is immersed in a liquid reactant. The pellet also includes at least one enveloping zone comprised of a second solid reactant means for evolving the gas at substantially the same predetermined rate as the first solid reactant means when the enveloping zone is immersed in the liquid reactant.

My invention may be better understood by reference to the following detailed description considered in conjunction with the drawings, in which.

Figure 1:
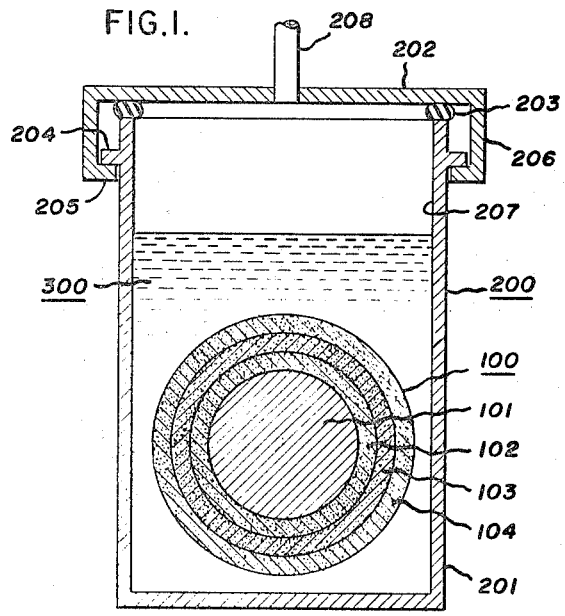
FIG. 1 is a vertical section of a gas generator and pellet.

In FIG. 1, a pellet 100 is shown contained in a gas generator 200 and immersed in a liquid reactant 300. In the specific embodiment illustrated the pellet is spherical and is comprised of a solid spherical inert core 101. The core serves as a convenient nucleus around which spherical shells 102, 103, and 104 of reactive material may be formed.

The gas generator is comprised of a lower housing portion 201 and an upper housing portion 202. An O-ring seal 203 lies between the upper and lower housing portions. The upper and lower housing portions are held in sealing engagement by a quickly connected and disconnected coupling represented by lugs 204 protruding outwardly from the lower housing portion and lugs 205 extending inwardly from an annular lip 206 of the upper housing portion. The housing portions together form a confining chamber 207. A conduit 208 is provided to communicate the confining chamber with the exterior of the housing so that gas which is evolved within the confining chamber may be conducted to an exterior point of use or storage.

In using the gas generator 200, a liquid reactant 300 is first added to the lower housing portion 201 in an amount sufficient to generate the desired amount of gas and sufficient to provide ample surface contact with a pellet to be later added. Subsequently a pellet is dropped into the liquid reactant. The upper housing portion 202 is then quickly positioned over the lower housing portion with the O-ring seal 203 interposed. Rotation of the upper housing portion with respect to the lower housing portion locks the lugs 204 and 205 in engagement as shown. The gas which initially leaves the generator will be contaminated by the air which was trapped above the liquid reactant. After allowing this contaminated portion of the gas to be vented to the atmosphere, the conduit 208 may be connected to a gas consuming cell, such as a fuel cell, or to a gas storage means.

If it is assumed that a pellet of conventional character is immersed in the liquid reactant 300, such as a spherical pellet formed entirely of a uniform composition, it can readily be seen that as reaction takes place at the surface of the pellet, the area of contact between the pellet and the liquid reactant will decrease. Since the composition of the pellet is uniform, the rate of gas generation will decrease progressively as the pellet is consumed by reaction.

My pellet construction 100 allows gas to be generated at a substantially uniform rate. The spherical shells 102, 103, and 104 of my pellet are each formed of differing compositions. In a simple form the shell 102 may be formed entirely of reactive material while shells 103 and 104 are formed with increasing amounts of a diluent, so that where the thickness of each zone is identical the outer zone will contain substantially the same amount of reactive material as the inner zone, although its volume is substantially greater. Thus, the rate at which the outer shell generates gas will correspond to the rate at which either of the inner zones generates gas. Hence, a substantially uniform rate of gas evolution is obtained at all times from the pellet.

The use of an inert core 101 is optional. The core is convenient to use since it facilitates molding of the shells. Also, it provides a convenient way to avoid low terminal rates of gas evolution while the center of the pellet is being consumed, as is experienced with conventional pellet constructions. It is recognized that the core 101 may be replaced in my pellet with a core of highly reactive material so that the rate of gas evolution remains high even when the relatively low surface area central portion is being consumed by reaction.

The reactants per se which go to make up the liquid reactant 300 and the pellet 100 are not novel and form no part of my invention. For example, it has long been appreciated that metals lying higher in the electromotive series than hydrogen may be used to displace hydrogen from water. A very simple technique of forming hydrogen is to bring a magnesium pellet into contact with a saline solution, such as sodium chloride dissolved in water. It is known that such pellets may be made to generate hydrogen at an even faster rate if quantities of a metal more noble than magnesium, such as nickel, iron, or copper is intermingled in particulate form with particles of magnesium and compressed together to form a pellet. In one well known type of pellet construction the sodium chloride is also incorporated in the pellet, so that the liquid reactant may be pure water, if desired. Magnesium is, of course, just one illustration of the metals that may be readily employed to generate hydrogen. Aluminum and zinc are two low cost, easily handled metals that are capable of displacing hydrogen from acid solutions. Hydrogen can also be conveniently generated from metal hydrides, such as alkali borohydrides and alkali aluminum hydrides, which produce hydrogen gas when contacted with water. It is recognized, of course, that the solid and liquid reactants may be chosen to generate any other desired gas in addition to hydrogen. Where the liquid reactant is water, as may be desired to reduce the logistics requirements of the gas generator to pellets alone (water being conveniently available at the site of use), the pellets may contain materials such as acid or base generating salts which will allow the solid reactant incorporated in the pellet to interact with the liquid reactant. The proper choice of a solid and a liquid reactant for use in any given gas generating application is considered to lie well within the skill of the art.

It is my concept to form a solid reactant containing pellet so that a central zone of the pellet reacts with a liquid reactant to generate gas at substantially the same rate as an enveloping zone of the pellet. In a simple form of my invention, this may be accomplished merely by adding to the composition of matter making up the enveloping zone a diluent which is inert to both the solid and liquid reactants. Thus, the larger surface area of the enveloping zone is counterbalanced by the dilution of reactive material so that gas is generated by the enveloping zone when immersed in liquid reactant at substantially the same rate as when the central zone is immersed in the same liquid reactant. Another technique for achieving the same result is to utilize different reactive materials to form the central and enveloping zones. If the more highly reactive material is utilized to form the central zone, then the necessity of utilizing a diluent may be avoided completely or, in the alternative, reduced over the amount of diluent that would be required if the central and enveloping zones were formed of the same reactive solid material. It is also anticipated that where a reactant adjuvant is present with the reactive material, the proportion of this material may be controlled in order to control the rate of reaction. For example, in a magnesium pellet containing nickel particles and sodium chloride to facilitate the reaction with water, limiting the proportion of nickel particles and/or sodium chloride in the outer or enveloping zones is one approach for regulating the reaction rate of the enveloping zones. Since the salt concentration within the water will increase with the reaction of each successive enveloping zone, it may not be essential to increase the salt concentration of the central zone or zones of the pellet in order for the reaction rates of such zones to be maintained on a par with the reaction rate of the enveloping zones.

While the pellet 100 is shown to be formed of three distinct shells or zones, it is appreciated that any number of enveloping zones may be utilized. The uniformity with which gas is generated will increase for any given pellet size with the increase of the number of enveloping zones employed. In the limiting case it is anticipated that a continuous gradation of the pellet composition may be achieved so that the reactivity per unit weight of the composition of matter making up the pellet is at any point along the radius of the pellet inversely proportional to the surface area of the pellet at that point. In the case of spherical pellets it is anticipated that the enveloping zones will take the form of concentric annular spheres. Where pellets of other geometries are employed, however, it is anticipated that those portions of the pellet having the shorter radius of curvature may contain proportionately less reactive material, since the shorter the radius of curvature, the greater the surface area per unit weight of material.

Where a multiplicity of enveloping zones are concentrically arranged it is preferred that each zone have a lower reaction rate per unit volume than the next inner zone so that gas will be evolved at the same rate from the concentric zones, despite the disparity in the surface areas presented. An exception to this may be presented by the outermost zone; however, I have found that when a reactive pellet is first dropped into a liquid coreactant there is a brief period during which the rate of gas evolution climbs from nothing to a maximum amount. The duration of this period will vary depending upon the reactants chosen and the physical construction of the pellet. In the case of porous pellets, for example those formed of compacted particles, the initial delay is attributable to occluded air lying in the voids inhibiting instantaneous penetration by the liquid reactant. It is an optional feature of my invention to avoid delay in achieving the desired rate of gas generation by not decreasing the reactivity per unit volume of the outermost enveloping zone as compared to that of the next inner zone. By forming the outermost zone of a material having the same or a higher reactivity per unit volume than the next inner zone, the higher (or equivalent) reactivity combined with the larger surface area of the outermost zone off sets the tendency for gas evolution to be initially inhibited. In this way a pellet may be provided which instantaneously evolves gas at the desired rate upon contact with a liquid and which continues to evolve gas at that same rate until it is consumed.

While I have described my invention with reference to maintaining the rate of gas evolution by a pellet at or near a uniform rate, it is appreciated that my teachings may be readily employed to form a pellet which will generate gas in any desired controlled manner. For example, a pellet may be formed which generates gas at a substantially uniform rate until until the innermost reactive zone is reached. This zone could be formed of a material that is highly reactive toward the liquid reactant or a material which disintegrates upon contact with the liquid reactant. An accelerated terminal rate of gas evolution would then be noted which could be used as an indicator that the pellet is in need of replacement. In the same manner a pellet may be formed that will provide a signal that any desired fraction has been consumed. For example, a pellet could be formed that would generate gas at an accelerated rate for a few seconds to indicate that the pellet will be totally consumed in 3 minutes. This would give a signal allowing another pellet or gas generator to be made ready for substitution.

Figure 2:
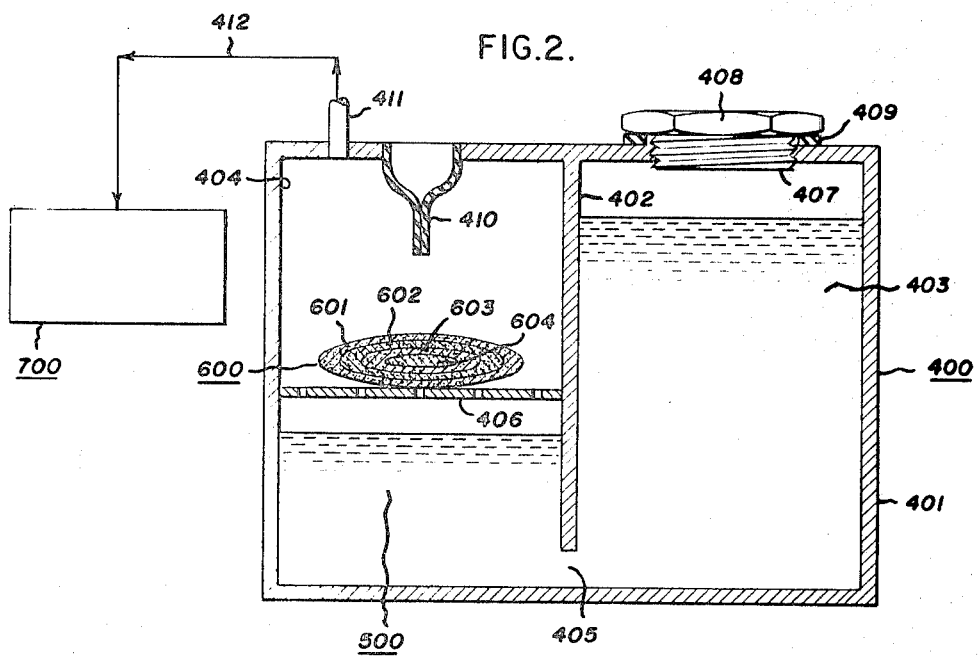
FIG. 2 is a vertical section of a pellet and gas generator, with a cell being schematically shown.

A preferred embodiment of my invention is illustrated in FIG. 2. As shown a Kipp-type generator 400 is illustrated having a liquid reactant 500 and a pellet 600 contained therein. The generator 400 is connected to a cell 700 capable of consuming gas evolved by the generator, such as a fuel cell.

The generator is comprised of a housing 401. The housing is provided with a central barrier 402 which divides the interior of the housing into a first chamber 403 and a second chamber 404. The first and second chambers communicate through the spacing 405 between the base of the housing and the lower end of the barrier. A perforate pellet retainer 406 is positioned within the second chamber supported by the barrier and housing. Liquid reactant and any nongaseous reaction products may be removed from the generator through the opening 407 which is normally closed by plug 408. Annular gasket 409 is provided to seal between the plug and the housing. As shown the plug is threaded to the housing, but any other conventional means of interconnection may be utilized. The pellet may be introduced into the second chamber through a one-way flexible valve orifice 410. Pressure inside the second chamber tends to collapse the valve orifice, thereby preventing the escape of gas therethrough. At the same time a pellet may be easily forced into the second chamber through the orifice. A fluid conduit 411 is provided to communicate the exterior of the housing with the second chamber.

As indicated by flow arrows 412, the gas generator may be connected to a cell 700 which is adapted to consume gas. This cell may be a fuel cell or a cell having a primary or secondary electrode of conventional construction and a fluid counter electrode. Such cells are commonly referred to as gas depolarized cells. Such cells may utilize a commonly employed battery electrode, such as a magnesium electrode, zinc electrode, aluminum electrode, cadmium electrode, etc. as one electrode and an oxygen electrode as a counter electrode. Where the cell 700 is a fuel cell, the gas generator 400 may be connected to the anode chamber or the cathode chamber thereof. It is anticipated that two gas generators of like or dissimilar construction may be employed, one connected to each of the anode and cathode chambers.

The distinct advantages of the combination shown in FIG. 2 may be best appreciated with reference to the mode of operation. Initially the liquid reactant 500 stands at an equal depth in each of the first and second chambers. The plug 408 is sealingly connected to the housing 401, and the fluid conduit 411 is connected to the cell 700. The pellet 600 is then inserted into the second chamber 404 through the normally closed flexible orifice 410. The pellet comes to rest on the perforate retainer 406 so that it contacts the liquid reactant. According to preferred practice a very highly reactive exterior layer is provided on the pellet, not shown, so that immediately upon contact with the liquid reactant it produces gas at the desired rate. Since this exterior layer is reacted immediately upon contact with the liquid reactant, it is not shown as a part of the pellet 600 in FIG. 2.

If it is assumed that the rate of gas consumption by the cell 700 is initially low as compared to the rate at which gas may be formed by the pellet, sufficient gas pressure will develop in the second chamber to force the liquid reactant level down. The gas generator would then have the appearance shown in FIG. 2. Once the liquid and pellet are out of contact, of course, the evolution of gas either ceases or is reduced to a very low rate. In this way a gas generator is provided which is responsive to the gas consuming demands of the cell. The rate of gas consumption by a cell may in turn be related to electrical demands placed on it. For example, when the electrodes of a fuel cell are connected through a high resistance or the circuit between the electrodes is opened, little or no gas will be consumed. If, however, the electrodes are connected through a low resistance or the electrodes are short circuited, a very high rate of gas consumption may result.

In the generator 400, whenever the gas evolved is consumed so that the pressure in the second chamber is again reduced, the liquid level will again rise into contact with the pellet and additional gas will be evolved. In an actual application where gas is being rapidly consumed by the cell 700 at near the capacity of the gas generator, the liquid level may fluctuate rhythmically, alternately bathing the entire surface of the pellet and dropping to a level completely out of contact with the pellet. By forming the pellet of a plurality of zones 601, 602, 603, and 604 with the centrally located zones being progressively more reactive per unit volume, the rate at which gas may be evolved by contact of the pellet and liquid reactant can be maintained constant, despite the progressively shrinking pellet surface area.

While I have described my invention with reference to certain specific embodiments, it is appreciated that numerous variations will readily occur to those skilled in the art once my invention is known to them. It is accordingly intended that the scope of my invention be determined with reference to the following claims.

I claim:

1. The combination comprising:
   cell capable of consuming a gas;
   means for generating the gas at a predetermined rate including a pellet having a central zone comprised of a first reactant means for evolving the gas at a predetermined rate when said central zone is immersed in a liquid reactant and at least one enveloping zone comprised of second solid reactant means for evolving the gas when said enveloping zone is immersed in the liquid reactant at substantially the same predetermined rate as said first solid reactant means when said central zone is immersed in the liquid reactant; and
   gas delivery means interconnecting said generating means and said cell.

2. The combination according to claim 1 in which said generating means is a Kipp generator.

3. The combination according to claim 1 in which said cell is a fuel cell.